（12） United States Patent
Zhou et al.

(10) Patent No.: US 11,095,131 B2
(45) Date of Patent: Aug. 17, 2021

(54) BATTERY MANAGEMENT SYSTEM AND ENERGY STORAGE POWER STATION

(71) Applicant: CONTEMPORARY AMPEREX TECHNOLOGY CO., LIMITED, Ningde (CN)

(72) Inventors: Fangjie Zhou, Ningde (CN); Qiandeng Li, Ningde (CN); Fuming Ye, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 239 days.

(21) Appl. No.: 16/411,390

(22) Filed: May 14, 2019

(65) Prior Publication Data

US 2020/0006961 A1 Jan. 2, 2020

(30) Foreign Application Priority Data

Jun. 29, 2018 (CN) .......................... 201810693878.6

(51) Int. Cl.
*H02J 7/00* (2006.01)
*H02J 9/06* (2006.01)

(52) U.S. Cl.
CPC .............. *H02J 7/0021* (2013.01); *H02J 9/06* (2013.01)

(58) Field of Classification Search
CPC .. H02J 9/06; H02J 7/0013; H02J 7/005; H02J 9/062; H02J 7/0047; H02J 7/0048;
(Continued)

(56) References Cited

U.S. PATENT DOCUMENTS 6,864,688 B2 * 3/2005 Beutelschiess ........... B60L 3/00
324/551
9,306,409 B2 * 4/2016 Yoo ......................... H02J 7/007
(Continued)

FOREIGN PATENT DOCUMENTS

CN 101707265 A 5/2010
CN 103389436 A * 11/2013
(Continued)

OTHER PUBLICATIONS

Extended European Search Report for European Application No. 19174405.1 dated Jun. 17, 2019.
(Continued)

*Primary Examiner* — M Baye Diao
(74) *Attorney, Agent, or Firm* — Heslin Rothenberg Farley & Mesiti P.C.

(57) ABSTRACT

Some embodiments relate to battery management technologies, and disclose a battery management system and an energy storage power station. The battery management system comprises: a plurality of CSC groups corresponding to a plurality of battery packs respectively, CSCs in each CSC group being connected to the battery units in a battery pack respectively; a plurality of SBMUs corresponding to the plurality of CSC groups respectively, each SBMU being connected to every CSC in a CSC group; an MBMU and an IMM, the MBMU being connected to every SBMU and connected to the IMM; the IMM further being connected to a plurality of the batteries, and used to acquire insulation parameter values of the plurality of the batteries.

17 Claims, 5 Drawing Sheets

(58) Field of Classification Search
CPC ...... H02J 7/0049; H02J 7/0014; H02J 7/0016; H02J 7/0018; H02J 7/0019; H02J 7/0024; H02J 7/0025; Y02E 60/10; H01M 10/4257; H01M 10/4207; H01M 10/482; H01M 2010/4271; H01M 2010/4278
USPC ............................................ 320/134
See application file for complete search history.

(56) References Cited

U.S. PATENT DOCUMENTS

| | | | |
|---|---|---|---|
| 9,395,417 | B2 | 7/2016 | Song |
| 9,444,285 | B2 * | 9/2016 | Kamiya ............... H02J 7/35 |
| 9,529,053 | B2 * | 12/2016 | Butzmann ........... H01M 10/482 |
| 2009/0066291 | A1 | 3/2009 | Tien et al. |
| 2014/0035365 | A1 * | 2/2014 | Yoo ................. H02J 13/0075 307/18 |
| 2017/0256825 | A1 * | 9/2017 | Sun ................. H01M 10/4257 |

FOREIGN PATENT DOCUMENTS

| | | | | |
|---|---|---|---|---|
| CN | 204333160 | U | | 5/2015 |
| CN | 105579919 | A | | 5/2016 |
| CN | 105990857 | A | | 10/2016 |
| CN | 106340687 | A | | 1/2017 |
| CN | 106536260 | A | | 3/2017 |
| CN | 107147153 | A | | 9/2017 |
| CN | 206774638 | U | | 12/2017 |
| CN | 108288862 | A * | 7/2018 | ............ H02J 7/0022 |
| CN | 108512262 | A * | 9/2018 | ............... H02J 7/00 |
| WO | 2013046978 | A1 | | 4/2013 |
| WO | 2017190703 | A1 | | 11/2017 |
| WO | 2018096969 | A1 | | 5/2018 |

OTHER PUBLICATIONS

The First Office Action and search report dated May 20, 2020 for Chinese application No. 201810693878.6, 21 pages.
The Second Office Action and search report dated Aug. 4, 2020 for Chinese application No. 201810693878.6, 20 pages.

* cited by examiner

BATTERY MANAGEMENT SYSTEM AND ENERGY STORAGE POWER STATION

CROSS-REFERENCE TO RELATED APPLICATION

This application claims the priority benefit of Chinese Patent Application Serial No. 201810693878.6 filed on Jun. 29, 2018 and entitled "BATTERY MANAGEMENT SYSTEM AND ENERGY STORAGE POWER STATION", the disclosure of which is incorporated by reference herein in its entirety.

TECHNICAL FIELD

Some embodiments of the present disclosure relates to battery management technologies, particularly, a battery management system and an energy storage power station.

BACKGROUND

A battery management system (BMS) is a link between batteries and a user. Performance of batteries is very complicated, and characteristics of different types of batteries vary significantly. The battery management system (BMS) mainly aims to improve battery utilization, prevent overcharge and over-discharge, prolong working life, and monitor conditions of batteries.

With the continuous development of battery technologies, there is an increasingly broader application of batteries as energy storage equipment for energy storage power stations. However, with continuous development of energy storage power stations, system capacities are enlarging. In order to reduce line loss, improve energy efficiency and reduce system cost (in case of the same power, the higher the voltage, the smaller the current, and further the less the line loss), there is increasingly higher requirement for the voltage and capacity and the like of energy storage batteries.

Inventors have found during the invention that at least the following problem exists in the existing technologies: a current BMS basically adopts a monolithic modular structure which can not satisfy safety requirements of a BMS and thus there will be major safety risks as larger battery capacity and higher voltage are required of energy storage batteries in an energy storage power station.

SUMMARY

Some embodiments of the present disclosure provide a battery management system and an energy storage power station, which may make data processing more efficient and reliable, and thus significantly improve safety and reliability of the battery management system and the energy storage power station.

Some embodiments of the present disclosure provide a battery management system applied to an energy storage power station. The energy storage power station includes a plurality of battery packs electrically connected; each battery pack comprises a plurality of battery units electrically connected. The battery management system includes: a plurality of cell supervision circuit (CSC) groups corresponding to the plurality of battery packs respectively, a plurality of slave battery management units (SBMUs) corresponding to the plurality of CSC groups respectively, a master battery management unit (MBMU) and an insulation monitoring module (IMM). CSCs in the CSC group are connected to battery units in the battery pack respectively; the CSC is used to acquire battery cell state data. Each SBMU is connected to CSCs in the CSC group; the SBMU is used to control the battery pack based at least on the battery cell state data and generate reported data of the batteries. The MBMU is connected to the SBMUs and connected to the IMM; the IMM is further connected to the plurality of battery packs, and used to acquire insulation parameter values of the plurality of the battery packs; the MBMU is used to interact with at least one external device according to the reported data of the battery packs and the insulation parameter values.

Some embodiments of the present disclosure further provide an energy storage power station that includes the above-described battery management system.

Compared with the existing technologies, some embodiments provide an implementation of a three-layered architecture that distributes functions of the battery management system to different layers to be executed independently. In this way, data processing becomes more efficient and reliable. Besides, since the insulation performance of the battery packs have particularly important influence on safety performance of the whole system, adding the IMM to specifically perform insulation detection on the battery packs may not only make known the insulation performance of the battery packs in real time, but also greatly improve safety and reliability of the battery management system and energy storage power station, satisfying requirements for battery packs with high voltage and high capacity, while not causing any burden to the MBMU, the SBMUs or the CSCs and not affecting implementation of basic battery management functions.

Further, the MBMU and the IMM are connected via a communication isolation unit. Isolation communication is applied, which may prevent interference which is caused by coupling high voltage to low voltage from being coupled to communication, and isolation communication may suppress common mode interference, and ensure that a bus is able to communicate reliably even if there is serious interference.

Further, the communication isolation unit comprises an isolation chip and an isolation power supply supplying power to the isolation chip, providing a method for implementing a communication isolation unit which may satisfy different requirements on isolation and voltage withstanding grades by selecting voltage withstanding grades of isolation power supplies and isolation chips.

Further, each of the low voltage sides of the battery management system and each of the high voltage sides where the battery packs locate are connected via a high voltage isolation unit respectively, and the low voltage sides comprises at least a low voltage circuit in the CSC and a low voltage circuit in the IMM. A high voltage isolation unit is added between a high voltage side and a low voltage side, which may further avoid interference of the high voltage side on the low voltage side, thereby meeting different insulation requirements, so that voltage of a battery pack may satisfy high requirements in design (the higher the voltage of the battery pack, the stricter the requirement on insulation).

Further, the MBMU is connected to an alternation power supply via a first AC/DC isolation switch power supply, and the SBMU is connected to the alternation power supply via a second AC/DC isolation switch power supply, the CSC is powered by the SBMU and the IMM is powered by the MBMU. That conventional AC is converted into DC to be used by the battery management system and the use of an isolation power supply may avoid the impact of AC power on the battery management system.

Further, the alternating power supply is connected to the first AC/DC isolation switch power supply and the second AC/DC isolation switch power supply via an uninterrupted power supply. Since the battery management system needs uninterrupted power supply for a long time, adding the uninterrupted power supply may prevent the battery management system from being shut down due to power failure of the AC power supply.

Further, a relay is connected between the second AC/DC isolation switch power supply and the alternating power supply, the MBMU is connected to a control terminal of the relay. The MBMU may control power supply of the SBMU, for example, in case of danger, the MBMU may directly shut down the power supply of the SBMU.

Further, the MBMU is connected to the battery packs via the first DC/DC isolation switch power supply, and the SBMU is connected to the battery packs via the second DC/DC isolation switch power supply, the CSC is powered by the SBMU and the IMM is powered by the MBMU. That is, the battery management system may be powered by the battery packs. In this way, as long as the battery packs have power, there will not be a risk of power failure to the battery management system, and thus the battery management system is relatively stable.

Further, the insulation parameter values are insulation resistance values, the IMM samples voltage values of the plurality of the battery packs, and the insulation resistance values of the plurality of the battery packs are obtained by calculation according to the voltage values. Some embodiments provide a particular method for acquiring insulation resistance values.

BRIEF DESCRIPTION OF THE DRAWINGS

One or more embodiments are illustrated by referring to the corresponding figures in the drawings. The exemplary descriptions do not constitute a limitation to the embodiments, and elements in the figures having the same reference numerals are denoted as similar elements. The figures in the drawings do not constitute a scale limitation unless otherwise stated.

DETAILED DESCRIPTION

The embodiments of the present disclosure will be described in detail below with reference to the accompanying drawings in order to make the objective, technical solutions and advantages of the present disclosure clearer. However, it will be apparent to skilled persons in the art that, in the embodiments of the present disclosure, numerous technical details are set forth in order to provide the reader with a better understanding of the present application. However, the technical solutions claimed in the present application can be implemented without these technical details and various changes and modifications based on the following embodiments.

Figure 1:
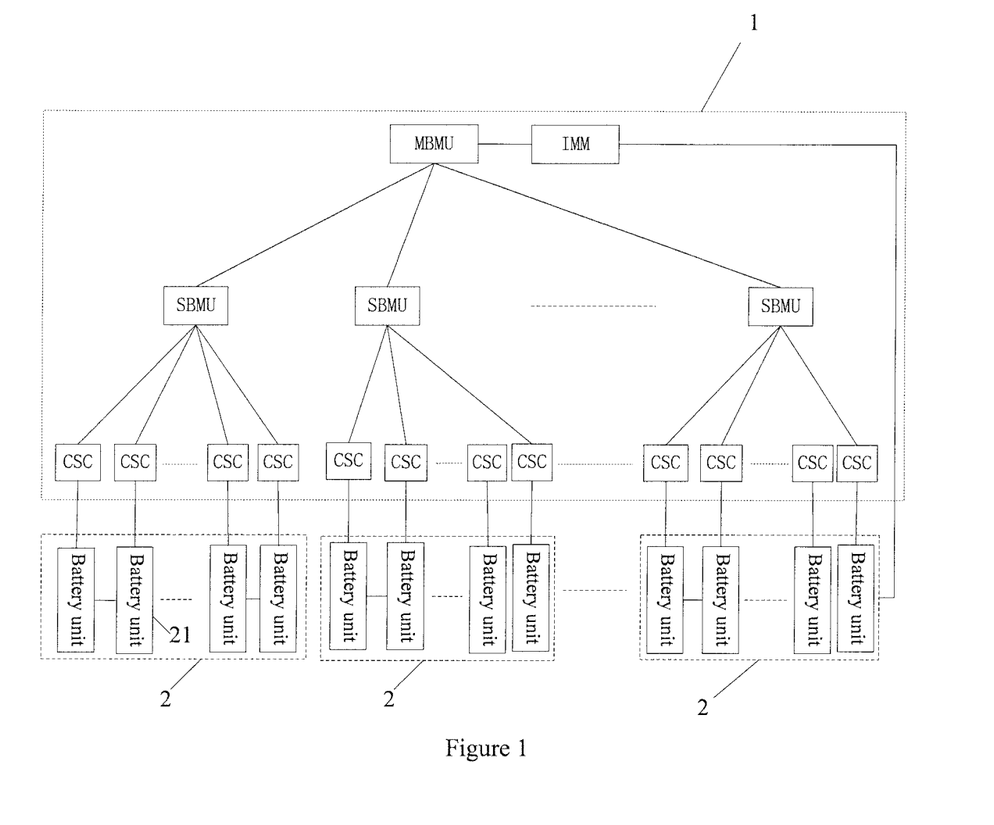
FIG. 1 is a schematic view showing a layered structure of a battery management system.

The present disclosure relates to a battery management system, and FIG. 1 is a schematic view showing a layered architecture of a battery management system. It is clearly seen from FIG. 1 that the battery management system 1 is a three-layered architecture: a master battery management unit (MBMU) and an insulation monitoring module (IMM) being the first layer, a plurality of slave battery management units (SBMU) being the second layer, and a plurality of cell supervision circuit (CSC) groups being the third layer.

The battery management system 1 is applied to an energy storage power station. The energy storage power station includes a plurality of battery packs 2 electrically connected, each battery pack includes a plurality of battery cells 21 electrically connected, the number of the CSC groups is equal to the number of the battery packs, and the CSC groups corresponds to the battery packs 2 respectively. Besides, the number of CSCs in the one CSC group is equal to the number of battery units 21 in one battery pack 2, and each of the CSCs is connected to each of the battery units 21 in the battery pack 2 respectively. Each CSC is used to acquire battery cell state data of the battery unit 21 to which the CSC is connected. The CSC may be a hardware unit or a unit combining hardware with software. Each battery unit includes a plurality of battery cells that are electrically connected. It shall be noted that each of the battery units in FIG. 1 may be denoted by a reference numeral 21, and FIG. 1 only exemplarily denotes a battery unit.

The number of the SBMUs is equal to the number of the CSC groups, and each of the SBMUs corresponds to each of the CSC groups respectively; each SBMU is connected to every CSC in the CSC group. The SBMUs are used to control the battery packs at least based on the battery cell state data, and generate reported data of the battery packs. The SBMU may be a hardware unit or a unit combining hardware with software.

The MBMU is connected to each of the SBMUs and to the IMM. The IMM is further connected to the plurality of battery packs 2 and is used to acquire insulation parameter values of the plurality of battery packs. The IMM may be a hardware unit or a unit combining hardware with software. The MBMU is used to interact with at least one external device in accordance with the reported data and the insulation parameter values of the battery packs. The MBMU may be a hardware unit or a unit combining hardware with software.

The number of the SBMUs in the battery management system 1 is determined by the CSC groups, the number of the CSC groups is determined by the number of the battery packs, and the number of the CSCs in each CSC group is determined by the battery units 21 in each battery pack 2; the number of the battery units 21 in each battery pack 2 and the number of the battery packs 2 are determined by a particular requirement in capacity of the energy storage power station. In other words, the number of the CSCs in each CSC group and the number of the CSC groups are determined by the particular requirement in capacity of the energy storage power station.

Compared with the existing technologies, this disclosure provides an implementation of a three-layered architecture that distributes functions of the battery management system 1 to different layers to be executed independently. In this way, data processing becomes more efficient and reliable. Besides, since the insulation performance of the battery packs have particularly important influence on safety performance of the whole system, adding the IMM to specifically perform insulation detection on the battery packs may not only make known the insulation performance of the battery packs in real time, but also greatly improve safety and reliability of the battery management system and energy storage power station, satisfying requirements for battery packs with high voltage and high capacity, while not causing any burden to the MBMU, the SBMUs or the CSCs and not affecting implementation of basic battery management functions.

Implementation details of the battery management system of the present disclosure are specifically described below. The following content is merely for facilitating understanding the implementation details provided, but is not indispensable for implementing the solution.

Figure 2:
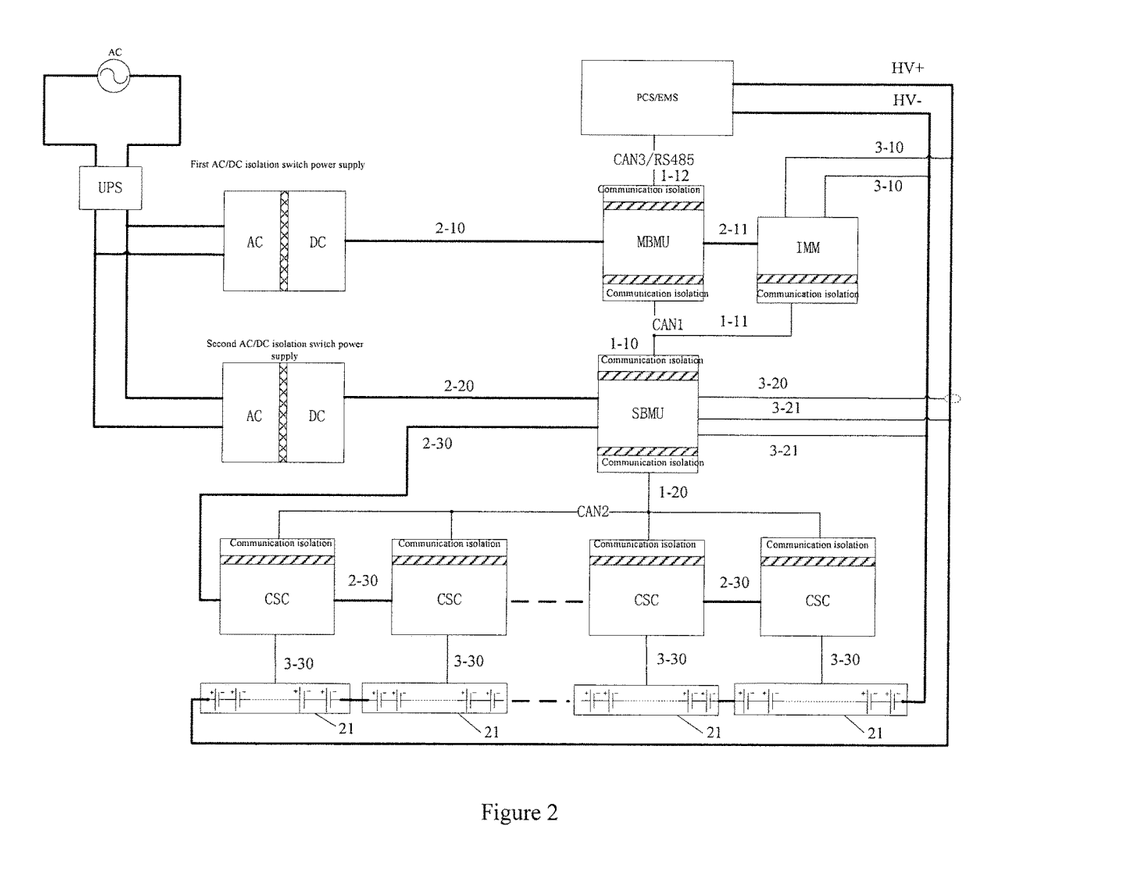
FIG. 2 is a schematic view showing an electrical architecture of a battery management system.

FIG. 2 is a schematic view showing an electrical architecture of a battery management system. FIG. 2 takes one CSC group as an example for description. Herein is only for exemplary description, but the number of the CSC groups is not limited. It shall be noted that the reference numeral 21 in FIG. 2 denotes a battery unit, which has the same meaning as the battery unit 21 shown in words in FIG. 1, the only difference is that FIG. 2 schematically shows the element structure, while FIG. 1 shows in words in blocks.

In FIG. 2, a numeral "1-" indicates a communication line, that is, 1-10 indicates a communication line between the MBMU and the SBMU, 1-11 indicates a communication line between the MBMU and the IMM, 1-12 indicates a communication line between the MBMU and an external device, and 1-20 indicates a communication line between the SBMU and a CSC. In addition, HV+ and HV− denoted in FIG. 2 respectively indicate that the external device is further connected to a positive electrode and a negative electrode of the plurality of battery packs 2. The external device shown in FIG. 2 may be, for example, a bi-directional power converter system (PCS), or an energy management system (EMS), which is not limited hereto.

In FIG. 2, a numeral "2-" indicates a power supply line, that is, 2-10 indicates a power supply line by which an external power supply supplies power to the MBMU, 2-11 indicates a power supply line by which the MBMU supplies power to the IMM, and 2-20 indicates a power supply line by which the external power supply supplies power to the SBMU, and 2-30 indicates a power supply line by which the SBMU supplies power to CSCs.

In FIG. 2, a numeral "3-" indicates a sampling line, that is, 3-10 indicates a voltage sampling line between the IMM and the battery pack 2, 3-20 indicates a current sampling line between the SBMU and the battery pack 2, 3-21 indicates a voltage sampling line between the SBMU and the battery pack 2, and 3-30 indicates battery state data sampling lines between the CSCs and the battery pack 2. The line 3-10 includes a positive electrode connecting line and a negative electrode connecting line between the IMM and the battery pack 2, and the line 3-21 includes a positive electrode connecting line and a negative electrode connecting line between the SBMU and the battery pack 2.

In this embodiment, CAN communication is applied between the MBMU and the IMM, between the MBMU and the SBMU, and between the SBMU and the CSC respectively. CAN communication, or RS484 communication or Ethernet interface communication may be applied between the MBMU and an external device. A CAN1 network (lines 1-10 and 1-11) is formed between the MBMU and the IMM, and between the MBMU and the SBMU respectively, a CAN2 network (line 1-20) is formed between the SBMU and the CSCs, and a CAN3 network or an RS485 network (line 1-12) is formed between the MBMU and an external device. The particular communication type is not limited herein.

The MBMU and the IMM are connected via a communication isolation unit. Further, the MBMU and the SBMU, the SBMU and the CSC, and the MBMU and the external device may also be connected via a communication isolation unit respectively. In this disclosure, it is taken as an example for description that the MBMU and the IMM, the MBMU and the SBMU, the SBMU and the CSC, and the MBMU and the external device are respectively connected via a communication isolation unit, but this disclosure is not limited thereto. "Communication isolation" shown in FIG. 2 indicates that a communication connection here is implemented by a communication isolation unit. As shown in the figure, each of the MBMU, IMM, SBMU, CSC is shown with "communication isolation", indicating that the MBMU, IMM, SBMU, CSC each has a communication isolation unit. Communication between the MBMU and the external device (line 1-12), communication between the MBMU and the IMM (line 1-11), communication between the MBMU and the SBMU (line 1-10), and communication between the SBMU and the CSC (1-20) are implemented by communication isolation units respectively.

Figure 3:
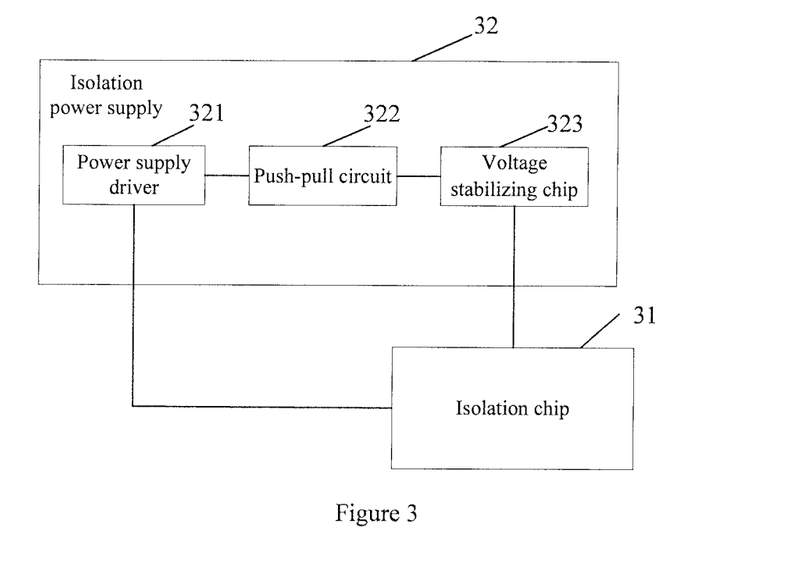
FIG. 3 is a block diagram showing a communication isolation unit in the battery management system.

FIG. 3 is a block diagram showing a communication isolation unit. The communication isolation unit includes an isolation chip 31 and an isolation power supply 32 for supplying power to the isolation chip. The isolation power supply 32 includes a power supply driver 321, a push-pull circuit 322, and a voltage stabilizing chip 323. An output terminal of the power supply driver 321 is connected to an input terminal of the push-pull circuit 322, an output terminal of the push-pull circuit 322 is connected to an input terminal of the voltage stabilizing chip 323, and an output terminal of the voltage stabilizing chip 323 is connected to the isolation chip 31. The power supply driver 321 is used to receive a power supply signal, and control the power supply signal to be output to the push-pull circuit 322 according to the preset waveform. The push-pull circuit 322A outputs an output voltage, and the output voltage is voltage-stabilized by the voltage stabilizing chip 323 and then is output to the isolation chip 31. The power supply driver 321 is further connected to the isolation chip 31 to supply power to the isolation chip 31. For example, the power supply driver 321 may be a chip SN6501 and a chip of an equivalent functional type, the push-pull circuit 322 may include a transformer and two diodes. The voltage stabilizing chip may be TPS76350 and a chip of an equivalent functional type. The isolation chip 31 may be TJA1052 and a chip of an equivalent functional type. In another communication isolation unit, the isolation chip and the isolation power supply may be integrated in a chip. Alternately, a capacitor and a transformer may be used to achieve communication isolation.

It shall be noted that, the specific type of the chip selected for the power supply driver 321, the specific type of the voltage stabilizing chip 323, and the specific type of the isolation chip 31 are not limited in any way and skilled persons in the art may decide according to practical conditions. For example, if the CAN communication is applied, the TJA1052 may be selected as the isolation chip 31, and the communication isolation unit is a CAN communication isolation unit. If RS485 communication is applied, Si8641BD-B-IS may be selected as the isolation chip 31, and the communication isolation unit is an RS485 communication isolation unit. In addition, Ethernet may also be used for communication, and in this case, the communication isolation unit is an Ethernet interface having isolation function. The communication isolation unit between the MBMU and the IMM, between the MBMU and the SBMU, and between the SBMU and the CSC respectively may be a CAN communication isolation unit. A communication isolation unit between the MBMU and the external device may be a CAN communication isolation unit, or an RS485 communication isolation unit, or an Ethernet interface having isolation function.

The present disclosure adopts the isolation communication, which may prevent interference which is caused by coupling high voltage to low voltage from being coupled to communication, and further the isolation communication may suppress common mode interference, and ensure that a bus is able to communicate reliably even if there is serious interference. Moreover, since the isolation power supply is implemented by the push-pull circuit, the isolation mode is transformer isolation. Different output voltage values may be obtained by adjusting a turn ratio of the transformer, and the application is relatively flexible. Requirements on isolation and voltage withstanding grades in different application environments may be satisfied by selecting voltage withstanding grades of the transformer and chip.

Conventional AC is converted into direct current (DC) to be used by the battery management unit, wherein the AC may be a mains power supply or an industrial power supply. As shown in FIG. 2, the MBMU is connected to the alternating power supply via the first AC/DC isolation switch power supply (line 2-10), and the SBMU is connected to the alternating power supply via the second AC/DC isolation switch power supply (line 2-20). The CSCs are powered by the SBMU (lines 2-30), and the IMM is powered by the MBMU (line 2-11). That conventional AC is converted into DC to be used by the battery management system and the use of an isolation power supply may avoid the impact of AC power on the battery management system. The first AC/DC isolation switch power supply and the second AC/DC isolation switch power supply are both reinforced in insulation by including isolation strips, cut grooves, etc., to better meet requirements.

Specifically, the first AC/DC isolation switch power supply converts AC into a first DC voltage to be output to the MBMU. The MBMU is powered by the first DC voltage which is used to further power the IMM. The second AC/DC isolation switch power supply converts AC into a second DC voltage to be output to the SBMU. The SBMU is powered by the second DC voltage which is used to power the CSC group connected to the SBMU. The CSCs in the CSC group are sequentially arranged, and the power supply lines are connected between neighboring CSCs. The SBMU may use the second DC voltage to power one CSC in the CSC group, and the powered CSC uses the second DC voltage to power a neighboring CSC, and so on. However, the present disclosure is not limited thereto, and the SBMU may respectively output voltages to the CSCs of the CSC group corresponding to the SBMU.

In addition, in an example, the first DC voltage value is equal to the second DC voltage value, for example, both may be 24 volts. The power supply voltage for the IMM is the first DC voltage, and the power supply voltage for the CSC is the second DC voltage. However, this disclosure is not limited thereto. That is, The first DC voltage value and the second DC voltage value may be different, the power supply voltage for the IMM may also be different from the first DC voltage (in this case, the MBMU is required to divide voltage or add voltage to the first DC voltage and output the divided or added voltage to the IMM), and the power supply voltage for the CSC may also be different from the second DC voltage (in this case, the SBMU is required to divide voltage or add voltage to the second DC voltage and output the divided or added voltage to the CSC).

In an example, the AC is connected to the first AC/DC isolation switch power supply and the second AC/DC isolation switch power supply via an uninterrupted power supply (UPS). Since the battery management system 1 needs uninterrupted power supply for a long time, adding the UPS may prevent the battery management system from being shut down due to power failure of the AC power supply.

In another example, a DC voltage supply may be used to directly power the battery management system. For example, the MBMU is connected to the battery pack 2 via the first DC/DC isolation switch power supply (not shown), the SBMU is connected to the battery pack 2 via the second DC/DC isolation switch power supply (not shown). The CSCs are powered by the SBMU, and the IMM is powered by the MBMU. That is, the battery management system 1 may be powered by battery pack 2. In this solution, as long as the battery pack 2 has power, there will not be a risk of power failure to the battery management system 1, and thus the battery management system 1 is relatively stable. The first DC/DC isolation switch power supply and the second DC/DC isolation switch power supply may be used as a single module, respectively. Alternatively, the first DC/DC isolation switch power supply may be integrated in the MBMU, and the second DC/DC isolation switch power supply may be integrated in the SBMU.

In an example, each CSC is used to acquire battery cell state data of the battery unit 21 connected to the CSC, the battery cell state data includes cell voltage, temperature of the battery unit 21 and the like.

The SBMU is used to control the battery pack 2 at least based on the battery cell state data, and generate reported data of the battery pack 2. Specifically, after the SBMU receives the battery cell state data reported by the CSCs, the SBMU controls the CSCs based on the cell voltage to achieve balancing management. The reported data of the battery pack 2 at least includes temperature of the battery units 21, that is, the SBMU reports at least the temperature of the battery units 21 to the MBMU.

The SBMU is further used to implement charge and discharge management of the battery pack. Specifically, the SBMU is also connected to a battery pack 2, the SBMU collects working current of the battery pack 2 via the line 3-20, and collects working voltage of the battery pack 2 via the line 3-21, and implements charge and discharge management of the battery pack 2 according to the working current and the working voltage. Further, the SBMU may further calculate the remaining power of the battery pack according to the working current (i.e., to perform SOC calculation), and the reported data further includes the remaining power of the battery pack.

Further, the SBMU may include a local fault detection mechanism used for monitoring a plurality of local fault parameters of the SBMU per se (a main chip and some functional modules in the SBMU). The reported data may further include parameter values of local fault parameters.

In FIG. 2, a CSC group is taken as an example, and a battery pack 2 is included. The IMM is connected to a positive electrode and a negative electrode of the battery pack 2 respectively, and is used to monitor the battery pack 2 and acquire an insulation parameter value of the battery pack 2. Specifically, the insulation parameter value may be an insulation resistance value. The IMM is connected to the battery pack 2, and collects a voltage value of the battery pack (collecting via the lines 3-10). The IMM calculates the insulation resistance value of the battery pack in accordance with the voltage value of the battery pack. In the case of a plurality of battery packs, the IMM is used to monitor a plurality of battery packs 2 and acquire insulation parameter values of a plurality of battery packs 2. Specifically, the insulation parameter values may be insulation resistance values. The IMM is connected to the plurality of electrically connected battery packs 2, and collects voltage values of a plurality of battery packs (collecting via the lines 3-10). The IMM calculates the insulation resistance values of the plurality of battery packs in accordance with voltage values of the plurality of battery packs. Since the plurality of battery packs 2 are electrically connected, and the IMM is connected to a positive electrode and a negative electrode of a set of battery packs, a collected voltage value refers to a voltage value of the plurality of battery packs 2 as long as the IMM is connected to one of the battery packs 2. Methods by which the IMM monitors the batteries include an AC signal injection method, a national standard method and derivative methods thereof.

The MBMU is used to interact with at least one external device according to the reported data and the insulation parameter values of the battery pack 2. For example, the MBMU is used to analyze the insulation parameter values and obtain insulation detection results of the plurality of battery packs 2. If an insulation detection result is that there is an insulation fault, the MBMU performs an interactive measure corresponding to the insulation fault on the external device. The MBMU may connect to a plurality of external devices such as a PCS, an EMS, a host computer and so on. When there is an insulation fault, the MBMU controls both the PCS and EMS to stop working to avoid danger; meanwhile, the MBMU may also send to the host computer a hazard warning signal for the host computer to send a hazard prompt (text display or sound alarm) in time.

The MBMU may perform a corresponding interactive measure according to the reported data of the battery pack 2, or perform a comprehensive evaluation according to the reported data of the battery pack 2 and the insulation parameter values, and perform corresponding interactive measure with the external device according to a result of the comprehensive evaluation. This disclosure does not define in any way how the MBMU determines whether to interact with the external device according to the reported data and the insulation parameter values of the battery pack 2, or how to interact with the external device.

Figure 4:
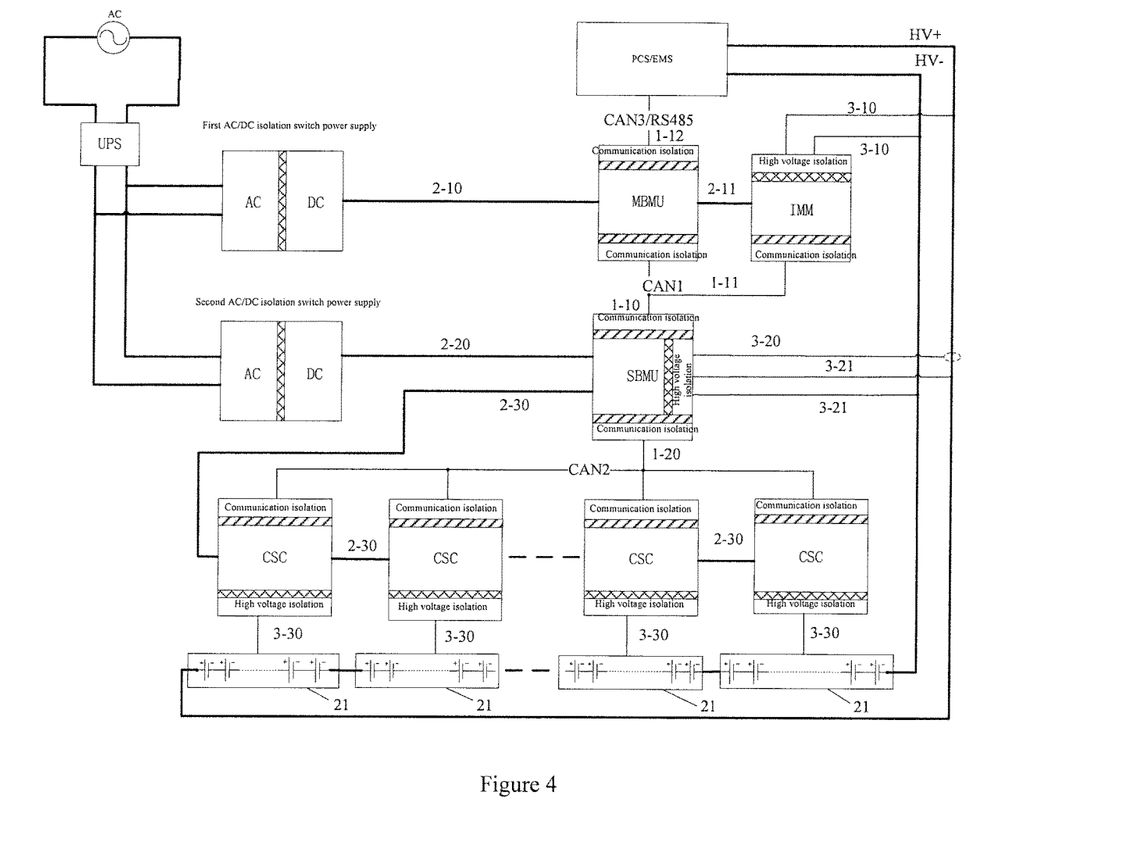
FIG. 4 is a schematic view showing another electrical architecture of a battery management system.

Besides, low voltage sides of the battery management system 1 and high voltage sides where the battery pack locates may be connected by high voltage isolation units respectively. FIG. 4 is a schematic view showing an electrical architecture of the battery management system. Low voltage sides of the battery management system 1 at least include a low voltage circuit in the CSC, a low voltage circuit in the IMM, and may further include a low voltage circuit in the SBMU. That is, each CSC and each battery unit 21 are isolated by a high voltage isolation unit, the IMM and the battery pack 2 are isolated by a high voltage isolation unit, and the SBMU and the battery pack 2 are isolated by a high voltage isolation unit. It shall be noted that a "high voltage isolation" shown in FIG. 4 indicates that the communication connection here is implemented by the high voltage isolation unit. As shown in the figure, the IMM, the SBMU, and the CSCs are shown with "high voltage isolation", indicating that each of the IMM, the SBMU, and the CSCs respectively has a high voltage isolation unit, and each of the connections between the IMM and the battery pack 2 (lines 3-10), between the SBMU and the battery pack 2 (line 3-20, lines 3-21), and between the CSCs and the battery pack 2 2 (lines 3-30) is implemented by a high voltage isolation unit.

The high voltage isolation unit may also include an isolation power supply and an isolation chip, wherein the isolation power supply may be the same as the isolation power supply in FIG. 2, and the isolation chip may be a Si8641BD-B-IS chip and a chip of an equivalent functional type. Further, a reinforced insulation measure may be implemented on the PCB where the high voltage isolation unit is located, and methods for strengthening insulation may include using isolating strips, grooving treatment, and the like.

In this disclosure, a high voltage isolation unit is added between a high voltage side and a low voltage side, which may further avoid interference of the high voltage side on the low voltage side, thereby meeting different insulation requirements, so that the voltage of the battery pack 2 may satisfy high requirements in design (the higher the voltage of a battery, the stricter the requirement on insulation).

It shall be noted that low voltage sides of the battery management system 1 are not enumerated and limited in any sense. As long as there is a connection between a low voltage side and a high voltage side, a voltage isolation unit may be set for isolation.

Figure 5:
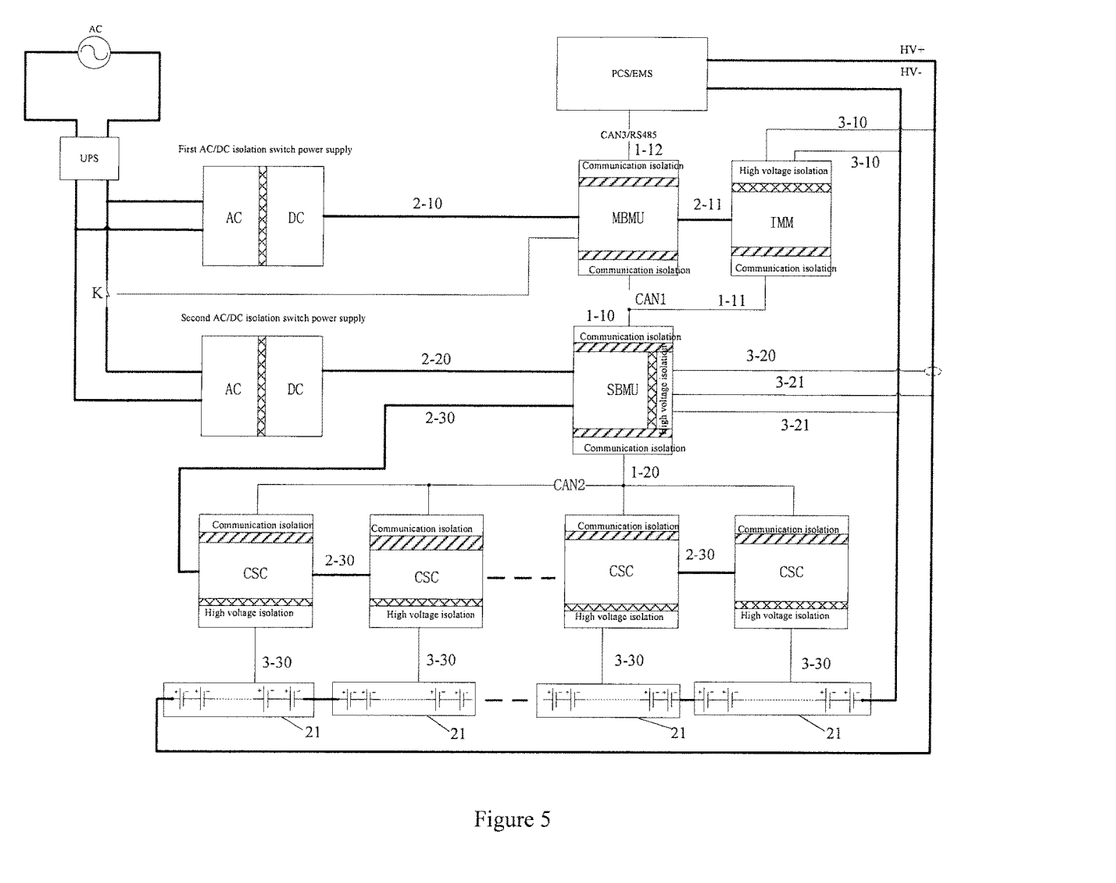
FIG. 5 is a schematic view showing another electrical architecture of a battery management system.

Further, the MBMU may control power supply of the SBMU. FIG. 5 is a schematic view showing an electrical architecture. A relay K is connected between the second AC/DC isolation switch power supply and the AC power supply. The MBMU is connected to a control terminal of the relay K. In this way, the MBMU may control power supply of the SBMU, for example, in case of danger, the MBMU may directly shut down the power supply of the SBMU.

The present disclosure further relates to an energy storage power station having the battery management system described above. Any one of FIG. 1 to FIG. 5 may be referred to, as an example.

Specifically, each battery pack 2, a CSC group corresponding to the battery pack 2, and an SBMU corresponding to the CSC group may be installed in a electric cabinet. The MBMU and the IMM may be installed in the main control cabinet. That is, the energy storage power station may include the main control cabinet and a plurality of electric cabinets; the plurality of electric cabinets are electrically connected.

The energy storage power station may be applied to grid-connected photovoltaic power generation.

It is worth mentioning that the modules described in this embodiment are logical modules. In practical use, a logical unit may be a physical unit or a part of a physical unit, or may be a plurality of physical units combined. Besides, in order to highlight creative parts of the present disclosure, this embodiment does not include units that are less closely related to the technical problem presented by the present disclosure, which, however, does not mean that there are no other units.

Skilled persons in the art may appreciate that the above embodiments are specific embodiments for implementing the present disclosure, but in practice, various changes may be made formally and in detail without departing from the scope of the present disclosure.

What is claimed is:

1. A battery management system, which is applied to an energy storage power station, wherein the energy storage power station comprises a plurality of battery packs electrically connected, each of the plurality of battery pack comprises a plurality of battery units electrically connected, and the battery management system comprises:
- a plurality of cell supervision circuit (CSC) groups corresponding to the plurality of battery packs respectively, wherein CSCs in each CSC group are connected to battery units in each battery pack respectively, and each CSC is configured to acquire battery cell state data;
- a plurality of slave battery management units (SBMU) corresponding to the plurality of CSC groups respectively, wherein each of the plurality of SBMUs is connected to each CSC in one CSC group respectively, and the plurality of SBMUs are configured to control the plurality of battery packs based at least on the battery cell state data and generate reported data of the plurality of battery packs;
- a master battery management unit (MBMU); and
- an insulation monitoring module (IMM); wherein
- the MBMU is connected to each SBMU and the IMM; the IMM is further connected to the plurality of battery packs and is configured to sample voltage values of the plurality of battery packs and calculate insulation resistance values of the plurality of battery packs according to the voltage values;
- the MBMU is configured to interact with at least one device external to the battery management system according to the reported data,
- the MBMU is further configured to analyze the insulation resistance values of the plurality of battery packs to obtain an insulation detection result of the plurality of battery packs, and further configured to perform a measure on the external device when the insulation detection result is that there is an insulation fault; wherein the measure corresponds to the insulation fault.

2. The battery management system according to claim 1, wherein the MBMU and the IMM are connected via a communication isolation unit.

3. The battery management system according to claim 2, wherein the communication isolation unit is a CAN communication isolation unit.

4. The battery management system according to claim 2, wherein the communication isolation unit comprises an isolation chip and an isolation power supply supplying power to the isolation chip.

5. The battery management system according to claim 1, wherein each CSC and each battery unit are isolated by a high voltage isolation unit, the IMM and the battery pack are isolated by a high voltage isolation unit, and the SBMU and the battery pack are isolated by a high voltage isolation unit.

6. The battery management system according to claim 1, wherein the MBMU is connected to an alternating power supply via a first AC/DC isolation switch power supply, and the SBMU is connected to the alternating power supply via a second AC/DC isolation switch power supply, the CSC is powered by the SBMU and the IMM is powered by the MBMU.

7. The battery management system according to claim 6, wherein the alternating power supply is connected to the first AC/DC isolation switch power supply and the second AC/DC isolation switch power supply via an uninterrupted power supply.

8. The battery management system according to claim 6, wherein a relay is connected between the second AC/DC isolation switch power supply and the alternating power supply, the MBMU is connected to a control terminal of the relay.

9. The battery management system according to claim 1, wherein the MBMU is connected to the battery packs via a first DC/DC isolation switch power supply, and the SBMU is connected to the battery packs via a second DC/DC isolation switch power supply, the CSC is powered by the SBMU, and the IMM is powered by the MBMU.

10. The battery management system according to claim 1, wherein the SBMU is further connected to the battery packs, and is configured to acquire working current of the battery packs and calculate remaining power of the battery packs according to the working current; the reported data of the battery packs comprise at least the remaining power of the battery packs.

11. The battery management system according to claim 1, wherein the IMM is configured to acquire insulation parameter values of the plurality of battery packs in a preset period.

12. An energy storage power station, comprising a battery management system, wherein,
- the energy storage power station comprises a plurality of battery packs electrically connected, each of the plurality of battery pack comprises a plurality of battery units electrically connected, and
- the battery management system comprises:
- a plurality of cell supervision circuit (CSC groups corresponding to the plurality of battery packs respectively, wherein CSCs in each CSC group are connected to battery units in each battery pack respectively, and each CSC is configured to acquire battery cell state data;
- a plurality of slave battery management units (SBMU) corresponding to the plurality of CSC groups respectively, wherein each of the plurality of SBMUs is connected to each CSC in one CSC group respectively, and the plurality of SBMUs are configured to control the plurality of battery packs based at least on the battery cell state data and generate reported data of the plurality of battery packs;
- a master battery management unit (MBMU); and
- an insulation monitoring module (IMM); wherein
- the MBMU is connected to each SBMU and the IMM; the IMM is further connected to the plurality of battery packs and is configured to sample voltage values of the plurality of battery packs and calculate insulation resistance values of the plurality of battery packs according to the voltage values;
- the MBMU is configured to interact with at least one device external to the battery management system according to the reported data,
- the MBMU is further configured to analyze the insulation resistance values of the plurality of battery packs to obtain an insulation detection result of the plurality of battery packs, and further configured to perform a measure on the external device when the insulation detection result is that there is an insulation fault; wherein the measure corresponds to the insulation fault.

13. The energy storage power station according to claim 12, wherein the MBMU and the IMM are connected via a communication isolation unit.

14. The energy storage power station according to claim 13, wherein the communication isolation unit comprises an isolation chip and an isolation power supply supplying power to the isolation chip.

15. The energy storage power station according to claim 12, wherein the MBMU is connected to an alternating power supply via a first AC/DC isolation switch power supply, and the SBMU is connected to the alternating power supply via a second AC/DC isolation switch power supply, the CSC is powered by the SBMU and the IMM is powered by the MBMU.

16. The energy storage power station according to claim 12, wherein the MBMU is connected to the battery packs via a first DC/DC isolation switch power supply, and the SBMU is connected to the battery packs via a second DC/DC isolation switch power supply, the CSC is powered by the SBMU, and the IMM is powered by the MBMU.

17. The energy storage power station according to claim 12, wherein the SBMU is further connected to the battery packs, and is configured to acquire working current of the battery packs and calculate remaining power of the battery packs according to the working current; the reported data of the battery packs comprise at least the remaining power of the battery packs.

* * * * *